(12) United States Patent
Gorra

(10) Patent No.: US 6,461,429 B1
(45) Date of Patent: Oct. 8, 2002

(54) VEHICLE TIRE DRESSING APPLICATOR

(75) Inventor: William M. Gorra, West Hartford, CT (US)

(73) Assignee: Simoniz USA, Inc., Bolton, CT (US)

( * ) Notice: Subject to any disclaimer, the term of this patent is extended or adjusted under 35 U.S.C. 154(b) by 0 days.

(21) Appl. No.: 09/565,798

(22) Filed: May 5, 2000

(51) Int. Cl.[7] .................................................. B05C 1/02
(52) U.S. Cl. ........................ 118/264; 118/304; 15/53.4; 15/53.1; 15/97.3
(58) Field of Search ................................. 118/264, 304; 15/53.4, 53.1, 53.2, 53.3, 97.3, DIG. 2; 134/44, 45, 49, 52, 123, 125, 129, 32

(56) References Cited

U.S. PATENT DOCUMENTS 4,968,166 A * 11/1990 Ingram .......................... 401/1
6,260,225 B1 * 7/2001 Bowman ..................... 15/53.4

* cited by examiner

Primary Examiner—Richard Crispino
Assistant Examiner—Yewebdar T Tadesse
(74) Attorney, Agent, or Firm—McCormick, Paulding & Huber LLP

(57) ABSTRACT

A vehicle tire dressing apparatus according to the present invention comprises left and right dressing applicators situated alongside a vehicle conveying track, the dressing applicators being moveable individually into contacting engagement with tires on left and right sides of a vehicle in the track. Each applicator has an applicator pad mounted to a mount bar and the mount bar is hinged to a frame which allows articulation of the applicator pad into and out of contact with the tires. The applicator pad is configured with a plurality of orifices, each of which orifices receives fluid sprayed from a complimentary spray nozzle. Each orifice has an elongated capillary which assists dispersing fluid into the pad. The spray nozzles emit fluid into the pads for a predetermined amount of time, the spraying being initiated by movement of the vehicle into proximity with the tire dressing assembly.

32 Claims, 5 Drawing Sheets

VEHICLE TIRE DRESSING APPLICATOR

BACKGROUND OF THE INVENTION

1. Technical Field

This invention pertains generally to apparatus for applying a fluid to vehicle tires and, in particular, to a method and apparatus for automatically applying a dressing fluid to the tires of a vehicle being conveyed within an automatic vehicle washing facility.

2. Background Art

It is well known in the vehicle washing industry to perform various automated steps during the vehicle washing process as the vehicle is conveyed through a washing facility. Over the years, numerous advances to such washing facilities have expedited and improved the washing process while decreasing the manpower requirements of the facility. For instance, the development of a cost-efficient, effective air drying system for vehicles eliminated the need to dry vehicles manually after the washing procedure is completed.

Historically, patrons to vehicle washing facilities have had the option of paying an additional fee and having a dressing fluid applied to the vehicle tires near the exit of the washing facility. The dressing fluid, which can be either water-or solvent-based, is applied directly to the tires to improve their appearance and provide a finishing touch to the exterior of the vehicle. There are various known methods for applying tire dressing fluids, none of which have successfully eliminated or even reduced manpower requirements, or improved the efficiency with which the dressing fluids are consumed by the washing facility.

One method of dressing vehicle tires is by manually applying the dressing as the vehicle approaches the washing facility exits or when the car has been moved outside the washing facility. In an inherently costly and labor intensive process, an attendant applies the fluid manually to each tire. Understandably, there is difficulty in controlling the amount of tire dressing fluid that is used by the attendant. One attendant may apply the fluid liberally to the applicator pad or towel, while another attendant may not use enough fluid. The result is that patrons may receive inconsistent service, and the cost of the tire dressing service is unnecessarily inflated to cover the cost of manpower and the dressing fluid consumed by the facility.

There have also been attempts to apply the dressing fluid automatically as the vehicle is prepared to exit the washing facility. Typically, one or more spray nozzles are used to spray fluid directly on the tires. While an automatic spraying device may eliminate the manual step of applying the fluid, spraying the tires automatically creates other problems.

Probably the worst problem is that the tires and wheels are usually sprayed together, so a large quantity of dressing fluid is wasted immediately when the wheels are sprayed. The tires must then be wiped to smooth any dripping fluid, and fluid must be removed completely from the wheels since the fluid can corrode certain types of wheels. As a result, instead of reducing manpower requirements by spraying tires with fluid, the amount of manual labor may actually be increased by the wiping requirements. There are also additional costs associated with products such as towels and gloves needed by the attendants to wipe down the tires and wheels.

Another problem with spraying tires with fluid is that the attendants who subsequently wipe the wheels and tires often do so outside the facility, which allows fluid to drip from the tires and wheels before the vehicle reaches the attendant. Especially in the winter, fluid on the ground may pose a hazard to patrons and employees walking over the dripped fluid. There may also be environmental concerns when dressing fluid drains from the washing facility property.

Still another problem with automatic tire spraying equipment is the result when the vehicle conveyor in the washing facility malfunctions. It is not infrequent that a vehicle jumps a roller or a stop on the conveyor which is used to pull the vehicle through the washing facility. The rollers or stops are typically linked to a pull chain driven and monitored by a computer control system. The computer control system tracks the location of the vehicle and controls the washing process by the locations of the roller or stop. If the vehicle is inadvertently moved away from the reference stop or roller and the computer controller does not recognize the move, the automatic spray equipment may miss the tires and possibly spray the vehicle body instead.

An apparatus is needed which effectively and efficiently applies a dressing fluid to vehicle tires in a vehicle washing facility. The present invention is directed to such an apparatus and a method for its use.

SUMMARY OF THE INVENTION

It is an object of the present invention to provide apparatus which automatically applies a dressing fluid to the tires of a vehicle that is being conveyed through a vehicle washing facility.

It is another object of the present invention to provide an apparatus which eliminates labor-intensive, manual tasks in applying tire dressing fluid to vehicle tires in a car washing facility.

It is yet another object of the present invention to provide an apparatus which applies a predetermined amount of tire dressing fluid to vehicle fires and void excessive product waste.

According to the present invention, a tire dressing assembly for applying dressing liquid to vehicle fires in a vehicle washing facility includes a pair of mechanical applicators which move an associated pair of applicator pads into contacting engagement with the fires as the vehicle is being conveyed in the washing facility. The applicator pads are soaked automatically with the dressing fluid via an arrangement of spray nozzles as the vehicle approaches the tire dressing assembly. A pair of adjustable hydraulic cylinders press the mechanical applicators and the soaked applicator pads against the tires to transfer the dressing fluid to the tires as the vehicle is conveyed through the fire dressing assembly.

According to one embodiment of the invention, the applicator pads have a concave contact surface that conforms to the shape of the tire sidewall.

According to another embodiment of the invention, the applicator pads have a convex contact surface that compresses when engaged with the tire sidewall.

One advantage of the present invention is the cost savings realized by automatically applying a dressing fluid to vehicle tires and eliminating labor-intensive, manual fluid application steps.

Another advantage of the present invention is the cost savings realized by efficiently controlling the amount of tire dressing fluid that is applied to vehicle tires.

Still yet another advantage of the present invention is that vehicles can be cleaned more efficiently in the washing facility by automatically applying tire dressing fluid.

These and other objects, features and advantages of the present invention will become more apparent in the light of

DESCRIPTION OF THE PREFERRED EMBODIMENT

Figure 1:
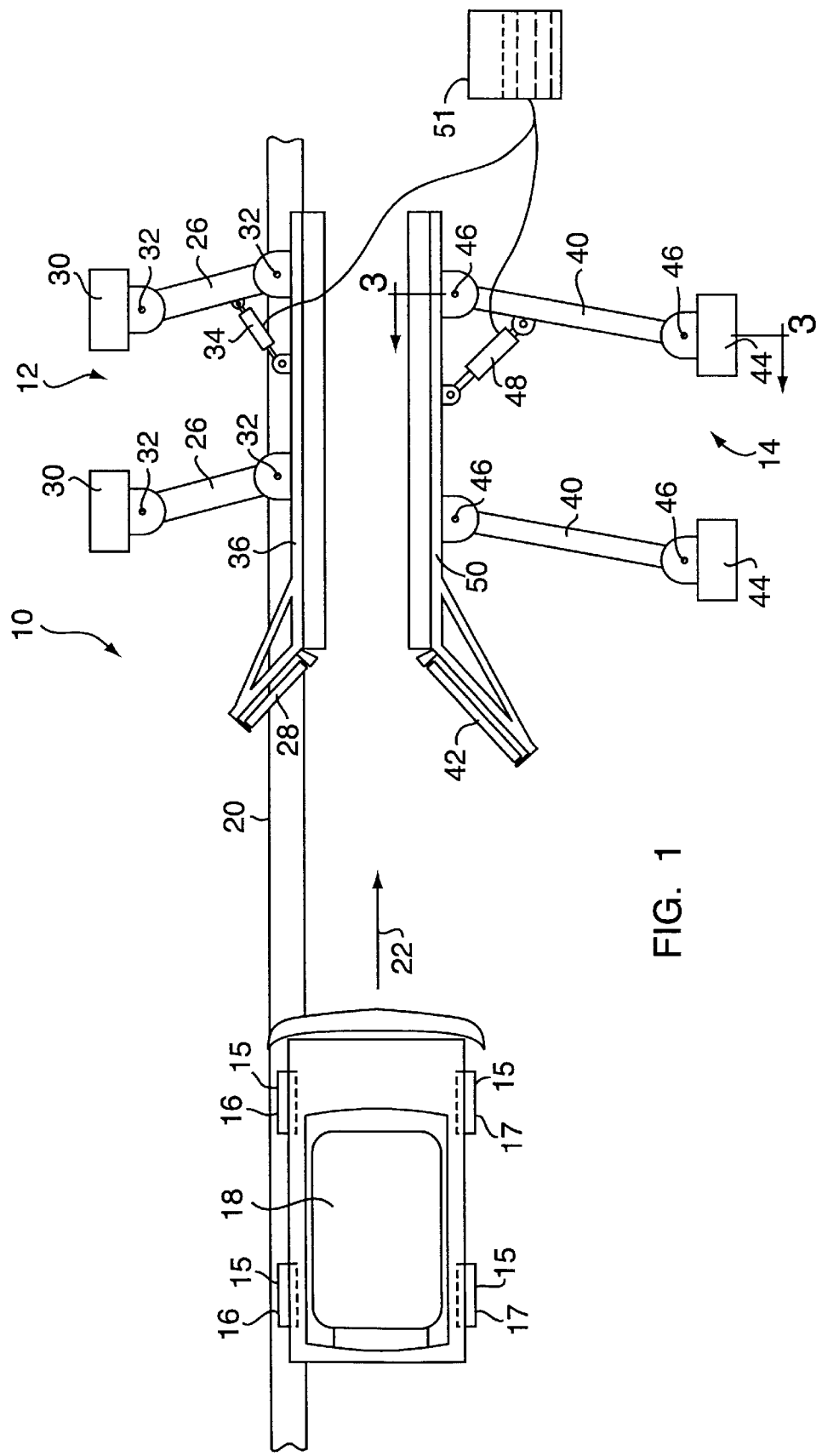
FIG. 1 is a schematic plan view of a tire dressing assembly according to one embodiment of the present invention showing a vehicle moving toward left and right tire dressing applicators.
Figure 2:
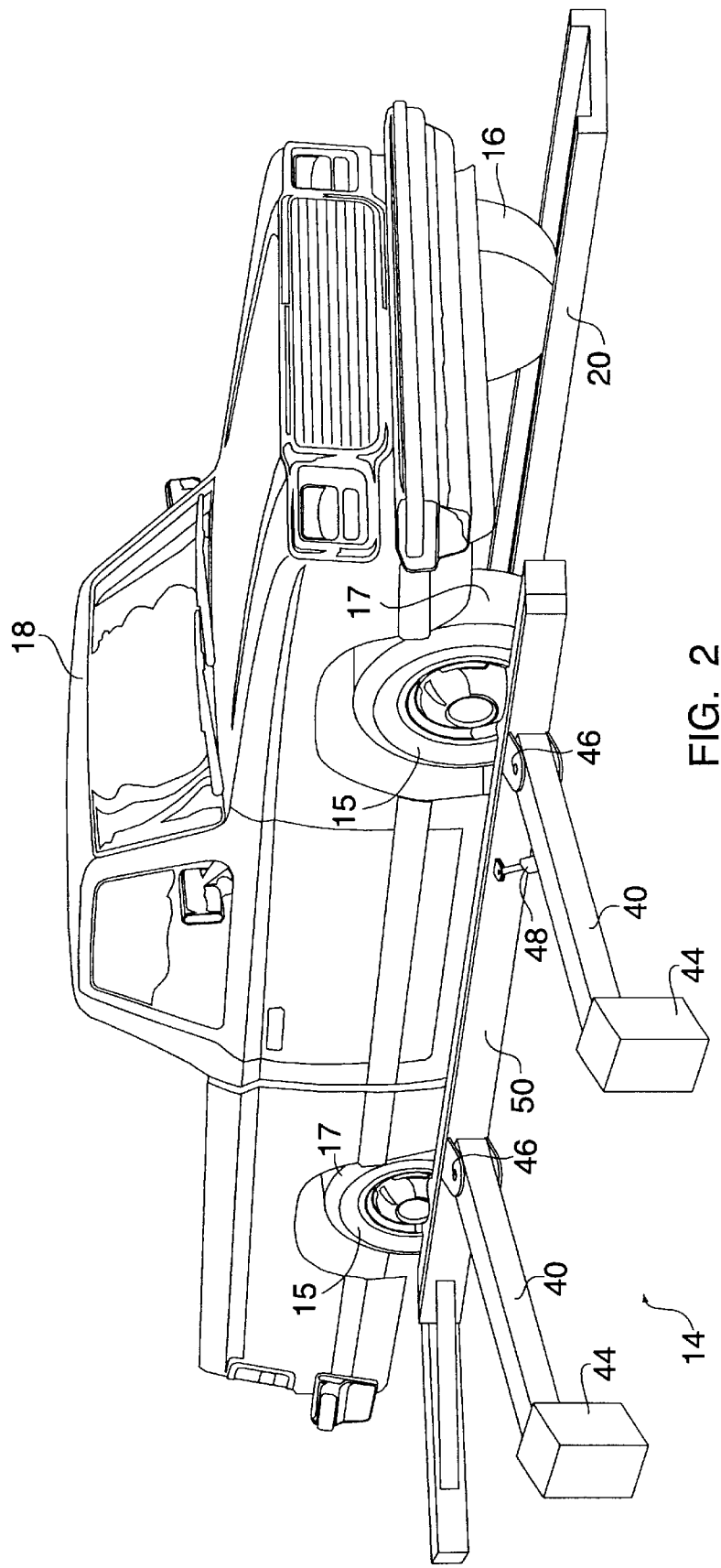
FIG. 2 is a somewhat enlarged, schematic perspective view of the fire dressing assembly of FIG. 1 showing the vehicle engaged with the right tire dressing applicator.

Referring to FIGS. 1–2, a vehicle fire dressing assembly 10 according to one embodiment of the present invention includes a left applicator 12 and a right applicator 14 which cooperate to apply a dressing fluid to sidewalls 15 of left and right fires 16, 17 of a vehicle 18. The vehicle 18 is conveyed along a track 20 of a vehicle washing facility in a direction indicated by arrow 22, the final portion of the washing facility being shown in FIGS. 1 & 2. The track 20 includes an arrangement of components, including a computer control system and conveying equipment (not shown), which are considered well-known in the art. The control system is used by the washing facility to monitor and determine the exact position of the vehicle in the track 20. It is intended that the present invention utilize the existing computer control system of the washing facility to initiate application of the fluid, as will be discussed in detail below.

The left and right applicators 12, 14 are deflected by the vehicle from dormant positions shown generally in FIG. 1 to contacting positions shown in FIG. 2 wherein each applicator 12, 14 automatically positions and adjusts itself to the width of the vehicle into a contacting orientation with the sidewalls of the tires 16, 17. The left applicator 12 moves in response to arrival of the left tires 16, and includes a pair of left swing arms 26, a left deflector roller 28, a pair of anchor posts 30, four pivot assemblies 32, a left cylinder 34, and a left mount bar 36. The pivot assemblies 32 allow the mount bar 36 to maintain a generally parallel relationship with the track 20. The left applicator 12 therefore remains in contacting engagement simultaneously with both left tires 16. Because the left tires 16 are always kept within the track 20, the left applicator 12 can effectively engage the tires with a minimal range of motion. In other words, as known in the industry, the left tires 16 provide a reference point for various mechanisms in the washing facility, including the present invention, which automatically adjusts to various vehicle widths by locating the right side of the vehicle 18.

The right applicator 14 is configured slightly differently from the applicator assembly 12 to articulate and permit passage of vehicle 18 upon arrival of the right tires 17, and includes a pair of right swing arms 40, a right deflector roller 42, a pair of anchor posts 44, four pivot assemblies 46, a right cylinder 48, and a right mount bar 50. The pivot assemblies 46 are identical to pivot assemblies 32 of the left applicator 12, but the swing arms 40 are slightly longer than swing arms 26. With the longer swing arms 40, the applicator 14 articulates in a larger arc compared to the applicator assembly 12. During articulation, the right mount bar 50 maintains a generally parallel relationship to the left mount bar 36 and to the track 20.

The left cylinder 34 is mounted between the left mount bars 36 and one of the swing arms 26, and the right cylinder 48 is mounted between the right mount bar 50 and one of the swing arms 40. Both of the cylinders 34, 48 are hydraulically actuated and are positioned so that when they are extended, the applicators 12, 14 are moved into the path of the vehicle being conveyed along the track 20. A fluid reservoir 51 is coupled to each cylinder 34, 48 and is pressurized with air so that the applicators 12, 14 are pressed against the tires with a desired amount of force once the vehicle is moved into engagement with the assembly 10. The pressure in the cylinders 34, 48 is adjustable so that the applicators can apply a desired amount of force to the tires by selecting an appropriate level of air pressure.

The left and right deflector rollers 28, 42 are positioned and oriented with respect to the mount bars 36, 50 to allow the vehicle 18 to impact the applicators 12, 14, force the applicators outwardly in a camming action, and allow entry of the vehicle 18 between the applicators. The right roller 42 has a slightly longer length than the left roller 28 to account for various vehicle widths.

Figure 3:
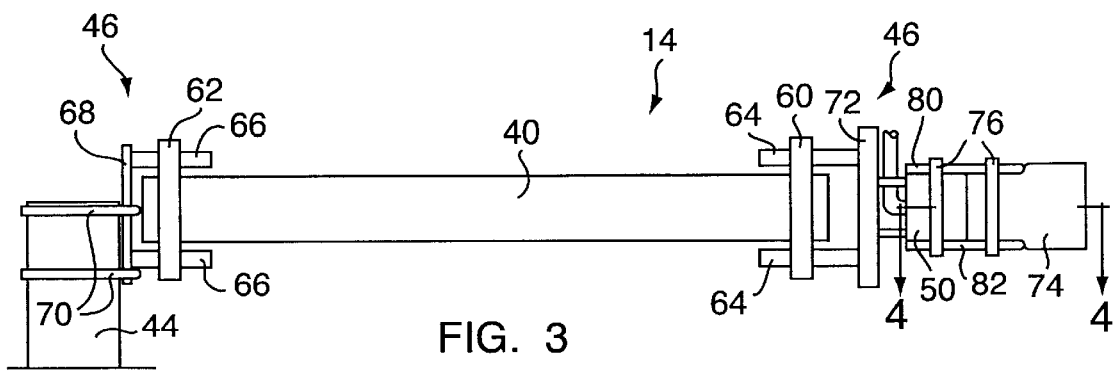
FIG. 3 is a cross-sectional view of the tire dressing apparatus of FIG. 1 taken along the lines 3—3.

Referring to the right applicator 14 shown in FIG. 3, the pivot assemblies 46 connect the swing arm 40 between the anchor post 44 and mount bar 50, and includes inner and outer pivot pins 60, 62, and inner and outer support bearings 64, 66. The outer support bearings are attached to an outer bearing mount 68 which, in turn, is fixed to the anchor post 44 via a pair of U-bolts 70. The U-bolts allow vertical movement of the applicator 14 relative to the ground by loosening the U-bolts 70 and moving the outer bearing mount 68 along the anchor post 44. The outer pivot pin 62 anchors the swing arm to the anchor post. The inner support bearings 64 are attached to an inner bearing mount 72. The inner pivot pin 60 pivotally couples the swing arm 40 to the mount bar 50. The swing arm, mount bar, and anchor post are constructed of aluminum, but these components can be constructed from other structural materials such as steel as long as rapid corrosion is prevented. It should be understood that the left applicator 12 has an arrangement of components that is, except for the length of the swing arms, substantially identical to that of the right applicator 14.

An elongated applicator pad 74 is bolted to the mount bar 50 via an arrangement of pad mount bolts 76 and upper and lower mount plates 80, 82. The applicator pad 74 is manufactured from either a hydrophobic or hydrophylic foam, depending on whether a solvent-based or a water-based dressing fluid is used. Hydrophobic foam is compatible for use with solvent-based fluid because it will absorb such fluid, and hydrophylic foam is compatible for use with water-based fluid. A benefit of using the hydrophobic foam is that the applicator pad 74 will retain the dressing fluid without absorbing water remaining on the tires from prior washing operations.

The foam is "reticulated," meaning that when manufactured, a known mechanical or chemical process is used to produce an inner arrangement of cells which increase the amount of fluid the foam is capable of retaining. Reticulating the foam also increases the ability of the foam to release the fluid to the tires when required to do so.

Figure 5:
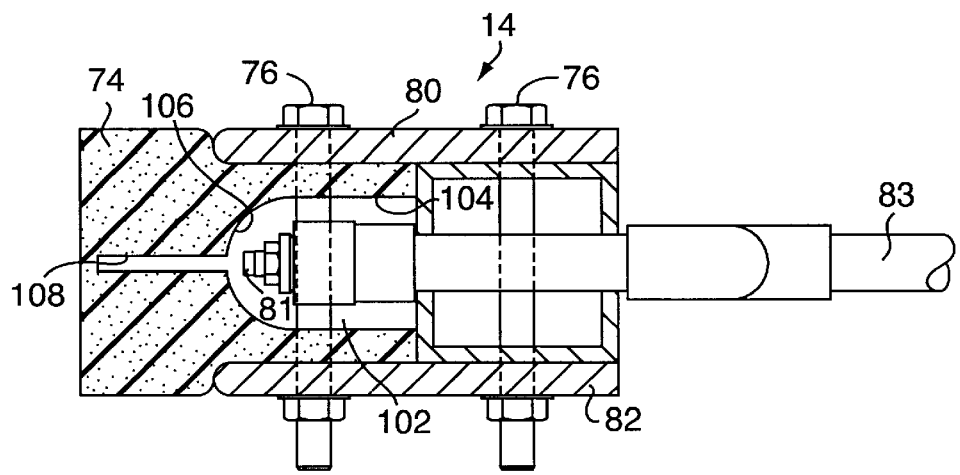
FIG. 5 is a cross sectional view of the tire dressing apparatus of FIG. 4 taken along the lines 5—5 showing the applicator pad clamped between upper and lower mount plates.
Figure 4:
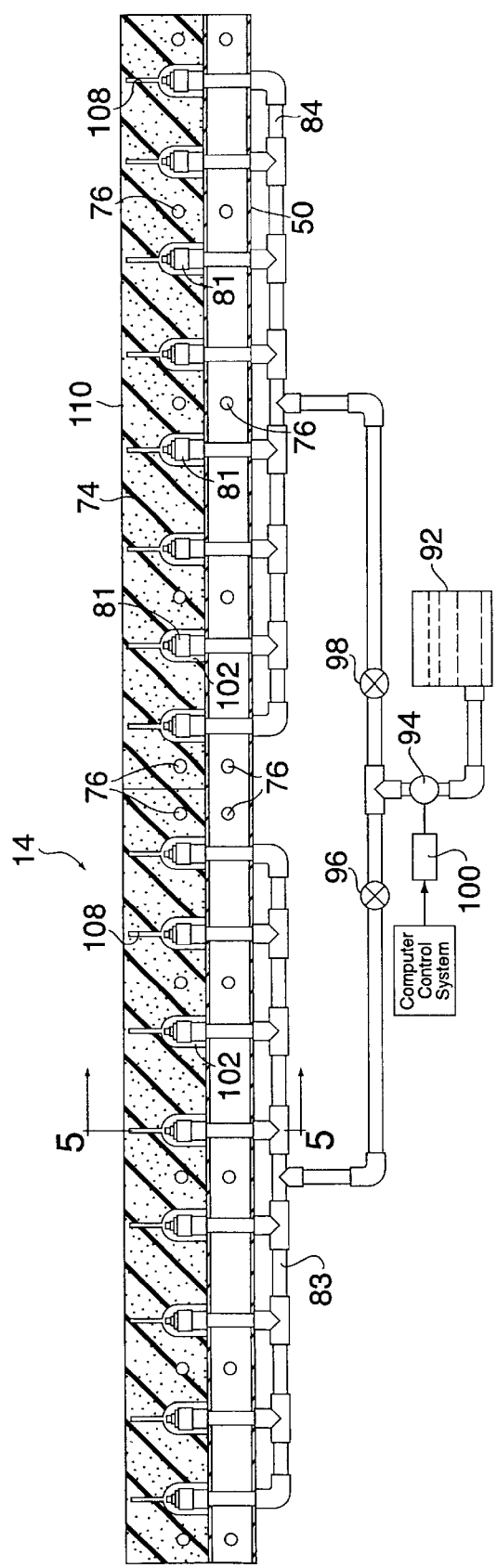
FIG. 4 is a cross sectional view of the tire dressing apparatus of FIG. 3 taken along the lines 4—4 illustrating an arrangement of spray nozzles positioned within an applicator pad.

Referring to FIGS. 4–5, the right applicator 14 includes a quantity of sixteen spray nozzles 81 mounted in an equally-spaced arrangement along the mount bar 50. The spray nozzles 81 are mounted such that they extend through the mount bar 50 and into the applicator pad 74. Each nozzle produces a conical spray pattern so as to effectively spray the fluid into the pad 74. Eight of the spray nozzles 81 are connected to a forward supply line 83 and soak a section of the pad 74 which first comes into contact with the vehicle. The remaining eight spray nozzles 81 are connected to a rear supply line 84. Each of the supply lines 83, 84 is connected to a fluid supply system 90 which can supply either the front eight nozzles 81, the rear eight nozzles 81, or all of the nozzles 81 to spray the fluid.

The fluid supply system 90 includes a reservoir 92 which stores the fluid, a pump 94 which forces the fluid to the spray nozzles 81, and valves 96, 98 which control fluid flow to the front and rear supply lines 83, 84, respectively. A conventional timer 100 provide power to the pump 94, and the timer 100 is triggered or actuated by the computer control system of the washing facility.

The applicator pad 74 is configured with a quantity of sixteen orifices 102 which loosely receive the spray nozzles 81 such that dressing fluid sprayed from the nozzles 81 is dispersed uniformly inside the orifice 102. Each orifice 102 includes a cylindrical portion 104, a concave end 106 and a blind bore or capillary 108 extending from the concave end 106 toward a contact surface 110 of the applicator pad 74. The capillary ends approximately 0.25 inches short of the contact surface 110 so that fluid wicked into the capillary is absorbed by the pad 74.

The dimensions of the contact surface 110 can be optimized according to the size of the tire being dressed and the point at which the pad 74 makes contact with the tires. That is, if the pad 74 contacts the tire in proximity with the area where the tire meets the ground, it is necessary to provide a larger (or taller) contact surface 110 so that the pad 74 coats the entire width of sidewall 15 from the ground to the wheel. On the other hand, if the pad 74 contacts the tire in proximity with the rotational axis of the wheel, then the pad is theoretically capable of contacting the entire sidewall 15 of the tire, regardless of the size of the contact surface 110, due to rotation of the tire.

Figure 6:
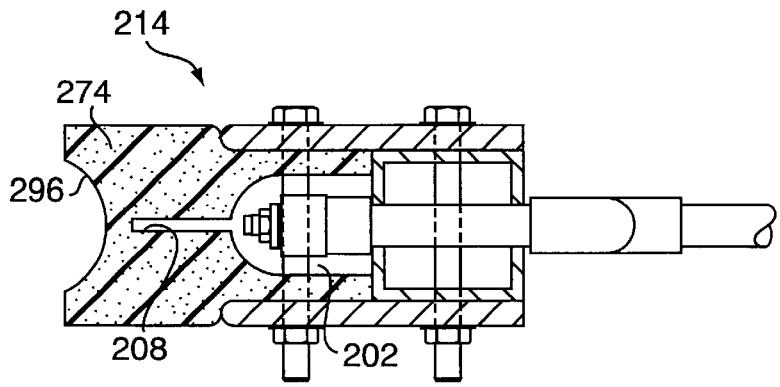
FIG. 6 is a cross sectional view of a second embodiment of the tire dressing apparatus of FIG. 5 reduced slightly in size and showing an applicator pad having a concave contact surface.

Referring to FIG. 6, another embodiment of the right applicator, designated by numeral 214, includes an applicator pad 274 having a concavely-shaped contact surface 296 that conforms to the surface of the tire in a manner different from pad 74. In particular, it can be seen that pad 274 is more readily able to conform the curved surface of the tire and coat the portions of the tire closest the wheel and the tread. The pad 274 has an arrangement of capillaries 208 which extend from the orifices 202 and end short of the contact surface 296.

Figure 7:
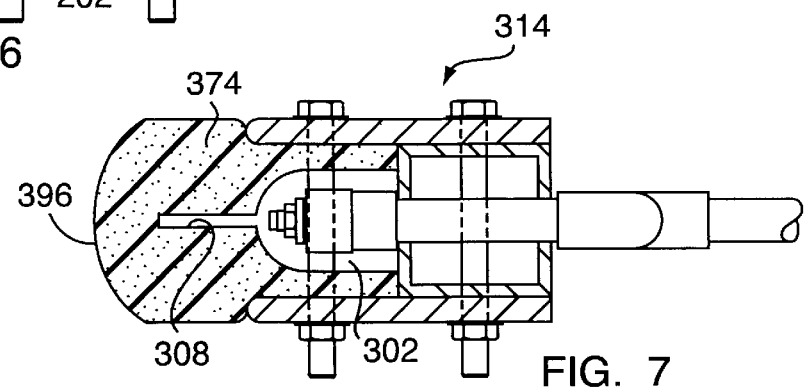
FIG. 7 is a cross sectional view of a third embodiment of the tire dressing apparatus of FIG. 5 reduced slightly in size and showing an applicator pad having a convex contact surface.

Referring to FIG. 7, a third embodiment of the right applicator, designated by numeral 314, includes an applicator pad 374 having a convexly-shaped contact surface 396. The convex shape allows the pad to flex easily upon initially contacting a tire due to the reduced surface area which initially contacts the tire.

Figure 8:
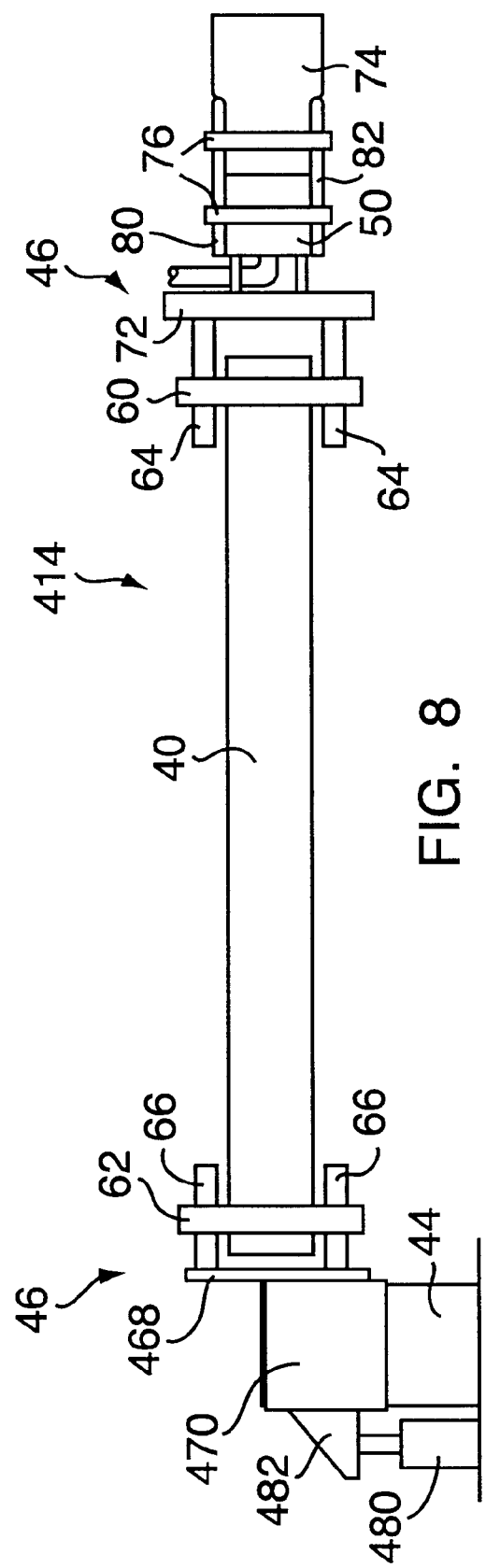
FIG. 8 is a cross-sectional view of a fourth embodiment of the tire dressing apparatus of FIG. 1 taken along the lines 3—3 and showing an applicator moveably coupled to a hydraulic cylinder.

Referring to FIG. 8, a fourth embodiment of the right applicator, designated by numeral 414, includes a sleeve 470 and a means 480, such as a hydraulic or pneumatic cylinder, for driving the sleeve 470 vertically along the anchor post 44. The sleeve 470 is attached with conventional fasteners to an outer bearing mount 468. A tab 482 is attached to the sleeve 470 to receive the means 480. Hence, the vertical position of the applicator 414 can be adjusted as desired by moving the sleeve along the anchor post.

The means 480 is in communication with the computer control system of the washing facility so that the height of the applicator 414 can be adjusted automatically according to the size of the tires being coated, or the height of the body of the vehicle. For a low-profile tire or a vehicle with minimal ground clearance, such as a sports car, it may be desired to lower the applicator as much as possible to avoid rubbing the applicator on the body of the vehicle or the wheels of the vehicle. For vehicles having wheels or hubcaps which protrude outwardly beyond the plane of the tire sidewall, it may be desirable to lower the applicator to avoid possible damage to the applicator.

In operation, when the vehicle arrives at a predetermined location on the track 20 (seen in FIG. 1), a signal is sent from the computer control system to the timer 100 to power the pump 94 for three seconds, thereby pumping fluid to the applicator pads 74. The time period can easily be lengthened or shortened depending on the flow rate of the pump and spray nozzles, or the absorption rate of the pads 74. The pump should be actuated at a position which gives the fluid enough time to soak in thoroughly before the vehicle engages the applicator pads. The valves 96, 98 are actuated individually to control delivery of fluid to either the front or the rear supply line 83, 84, or both simultaneously.

The vehicle is moved into engagement with the applicators 12, 14, and the pads are then pressed against the tires of the vehicle by the force of the pressurized air in cylinder 51. Air pressure in the reservoir 51 is adjusted until the applicator pads are pressed against the tires with a force that deforms and conforms the applicator pads to the contour of the tire sidewalls 15. The efficiency and effectiveness of the applicator pads can be adjusted by raising or lowering the applicators 12, 14 on their respective anchor posts.

While several preferred embodiments of the novel tire dressing assembly have been shown and described above, various modifications and substitutions may be made without departing from the spirit and scope of the invention. For example, other types of foams may be used that compatible other types of fluids, and foam having more or less hardness and/or rigidity may be used. In the event that a water-based fluid is applied to the tires, it may be advantageous to adapt a wiping or drying mechanism to remove as much water from the tires as possible before the pad contacts the tire so that water from the tire is not absorbed by the pad. Such a wiping mechanism can be incorporated into the pad by providing an impermeable layer of material on the upper and/or lower surfaces of the pad so that water is wiped from the tires prior to application of the dressing fluid.

Further, it is considered within the scope of the present invention to configure the applicator pads with other arrangements of capillaries, such as lateral capillaries which connect the spray nozzle orifices to each other, thereby changing the distribution characteristics of the dressing fluid in the pad.

It is also considered within the scope of the present invention to arrange the fluid supply lines and fluid supply system such that dressing fluid is pumped to various arrangements of nozzles within the applicator pad. For instance, it may be desirable to connect each supply line to every other spray nozzle so that one supply line can be deactivated and the applicator pad will still be soaked enough to effect proper tire coating. Other types of spray nozzles can be used to spray the fluid in something other than a conical pattern.

Yet further, it is considered within the scope of the present invention to provide applicators which coat a single tire of the vehicle at a time. Such an applicator is useful in a facility other than a washing facility.

It is also considered within the scope of the present invention to fit the tire dressing assembly with an assortment of differently-sized and/or shaped applicator pads. Each applicator would be capable of automatically selecting an appropriately-sized pad for use based upon input received from the computer control system of the washing facility. With such an arrangement, pads can be sized to accommodate tires having a low profile, or larger tires for vehicles such as pickup trucks. An alternative arrangement is to provide several applicator assemblies adjacent one another, each assembly having applicator pads of a different size. A vehicle being processed can be conveyed to the applicator having the appropriately-sized applicator pads for that vehicle.

Still further, it is considered within the scope of the present invention to utilize the applicator assemblies to apply fluids other than dressings, such as cleaner, before or during the time the vehicle is washed.

Accordingly, it is to be understood that the present invention has been described by way of illustration, and not by way of limitation.

I claim:

1. Apparatus for applying fluid to tires of a vehicle, comprising:
    left and right applicator pads having opposed inner surfaces, each of said inner surfaces engageable with at least one tire on left and right sides of the vehicle, respectively, said pads having outer surfaces mounted respectively to left and right mount bars, said left applicator pad inner surface being engageable with at least one tire on a left side of the vehicle, said right applicator pad inner surface being engageable with at least one tire on a right side of said vehicle;
    a fluid spray nozzle positioned to apply fluid to each of said applicator pads;
    means for articulating said mount bars to bring said left and right inner surfaces of the applicator pads into contacting engagement with the left and right tires, respectively; and
    means for supplying fluid to each of said spray nozzles.

2. The apparatus according to claim 1, wherein said applicator pads are constructed of a hydrophobic foam.

3. The apparatus according to claim 1, wherein said applicator pads are constructed of a hydrophilic foam.

4. The apparatus according to claim 1, wherein the fluid spray nozzle is one of a plurality of fluid spray nozzles arranged to supply fluid to said pads.

5. The apparatus according to claim 4, wherein each of said pads has a plurality of orifices complimentary to said plurality of spray nozzles, each of said orifices extending into said pad from said outer surface and ending short of said inner surface and adapted to receive one of said spray nozzles.

6. The apparatus according to claim 5, wherein said spray nozzles emit fluid in a conical pattern.

7. The apparatus according to claim 5, wherein each orifice has a blind bore extending into said pad from said orifice and ending short of said inner surface.

8. The apparatus according to claim 5, wherein said plurality of spray nozzles is divided into forward and rear sections of spray nozzles, and said fluid supplying means includes means for providing the fluid to said forward sections independently of said rear sections.

9. The apparatus according to claim 1, wherein said means for articulating said mount bars moves said mount bars in a generally horizontal plane into and out of contacting engagement with the tires.

10. The apparatus according to claim 1, wherein each of said mount bars comprises a roller positioned to impact said left and right tires, respectively, and deflect said mount bars a distance sufficient to effect engagement of said pads with said tires.

11. The apparatus according to claim 1, wherein said fluid supplying means is actuated by a timer.

12. The apparatus according to claim 11, wherein the timer is coupled to a computer control system of a washing facility.

13. Apparatus for applying fluid to a tire of a vehicle, comprising:
    an applicator pad having a contact surface engagable with the tire, said applicator pad being attached to a mounting means movable relative to the vehicle;
    means for delivering the fluid to said applicator pad; and
    means for articulating said mounting means to bring said contact surface of said applicator pad into contacting engagement with the tire.

14. The apparatus according to claim 1, wherein a portion of the fluid spray nozzle extends into the interior of said applicator pads.

15. An apparatus for applying fluid to a tire of a vehicle, comprising:
    an applicator pad having a surface engageable with at least one tire of a vehicle;
    a mount bar adapted to support said applicator pad;
    a fluid spray nozzle for dispensing a fluid to said applicator pad;
    means for supplying the fluid to said spray nozzle; and
    said mount bar is movable for engaging and disengaging said applicator pad with the sidewall of said tire for applying said fluid thereon.

16. The apparatus for applying fluid to the tires of a vehicle as claimed in claim 15 wherein said applicator pad is foam.

17. The apparatus for applying fluid to the tires of a vehicle as claimed in claim 15 wherein the pad is foam, and a portion of said spray nozzle extends into the interior of the applicator pad for dispensing fluid within said applicator pad.

18. The apparatus for applying fluid to the tires of a vehicle as claimed in claim 17 wherein said pad defines an orifice for receiving said portion of said spray nozzle therein.

19. The apparatus for applying fluid to the tires of a vehicle as claimed in claim 18 wherein a blind bore extends into said pad from said orifice and ends short of said surface on said applicator pad for engaging said tire.

20. The apparatus for applying fluid to the tires of a vehicle as claimed in claim 18 further comprising:
   said applicator pad having an elongated length thereof;
   said applicator pad defining a plurality of orifices spaced apart along the length thereof;
   said spray nozzle comprising a plurality of spray nozzles positioned to supply the fluid to said applicator pad via said plurality of orifices for providing said fluid to the entire length of said applicator pad.

21. The apparatus for applying fluid to the tires of a vehicle as claimed in claim 20 wherein said plurality of spray nozzles comprises a first group of spray nozzles and a second group of spray nozzles wherein said first group of nozzles is for supplying said fluid to a first portion of said elongated applicator pad and said second group of nozzles is for supplying fluid to a second portion of said elongated applicator pad and said first and second groups of nozzles are operable independent one from the other.

22. The apparatus for applying fluid to the tires of a vehicle as claimed in claim 15 wherein said mount bar is movable toward and away from the tires of said vehicle in a generally horizontal plane for engaging and disengaging said applicator pad with said at least one fire of said vehicle.

23. An apparatus for applying fluid to a tire of a vehicle, comprising:
   an applicator pad having a surface thereon engageable with at least one tire of a vehicle;
   a mount bar adapted to support said applicator pad;
   a plurality of fluid spray nozzles for dispensing a fluid to said applicator pad;
   a plurality of orifices in said applicator pad for receiving at least a portion of said plurality of spray nozzles such that said fluid is dispensed to said applicator pad through said orifices;
   means for supplying a fluid to said spray nozzles; and
   said mount bar is movable for engaging and disengaging said applicator pad with the sidewall of said fire for applying said fluid thereon.

24. An apparatus according to claim 23 wherein said applicator pad is elongated having a length thereof and said plurality of orifices are spaced apart along said length for dispensing said fluid to the entire length of said applicator pad.

25. An apparatus according to claim 23 wherein said applicator pad is foam.

26. An apparatus according to claim 25 wherein said applicator pad is hydrophobic.

27. An apparatus according to claim 25 wherein said applicator pad is hydrophilic.

28. An apparatus according to claim 23 wherein said plurality of orifices are connected one to the other.

29. An apparatus according to claim 23 wherein said at least one tire of said vehicle is rotating and said fluid is applied to the sidewall of the rotating tire.

30. An apparatus according to claim 29 in which said vehicle is moving and said tire is rolling in contact with the ground; and
   said applicator pad is elongated in the direction of the motion of the vehicle and engaged with said at least one fire of said vehicle.

31. An apparatus according to claim 23 wherein said apparatus is installed in an automatic car wash facility.

32. An apparatus according to claim 31 further comprising a computer control system wherein a predetermined location of said vehicle in said car wash facility activates said control system for controlling the apparatus for applying said fluid to said at least one tire of said vehicle.

* * * * *

UNITED STATES PATENT AND TRADEMARK OFFICE
CERTIFICATE OF CORRECTION

PATENT NO.   : 6,461,429 B1
DATED        : October 8, 2002
INVENTOR(S)  : William M. Gorra It is certified that error appears in the above-identified patent and that said Letters Patent is hereby corrected as shown below:

Column 9,
Line 23, the word "fire" should read -- tire --.

Column 10,
Lines 3 and 26, the word "fire" should read -- tire --.

Signed and Sealed this

Eighteenth Day of February, 2003

JAMES E. ROGAN
*Director of the United States Patent and Trademark Office*